UNITED STATES PATENT OFFICE.

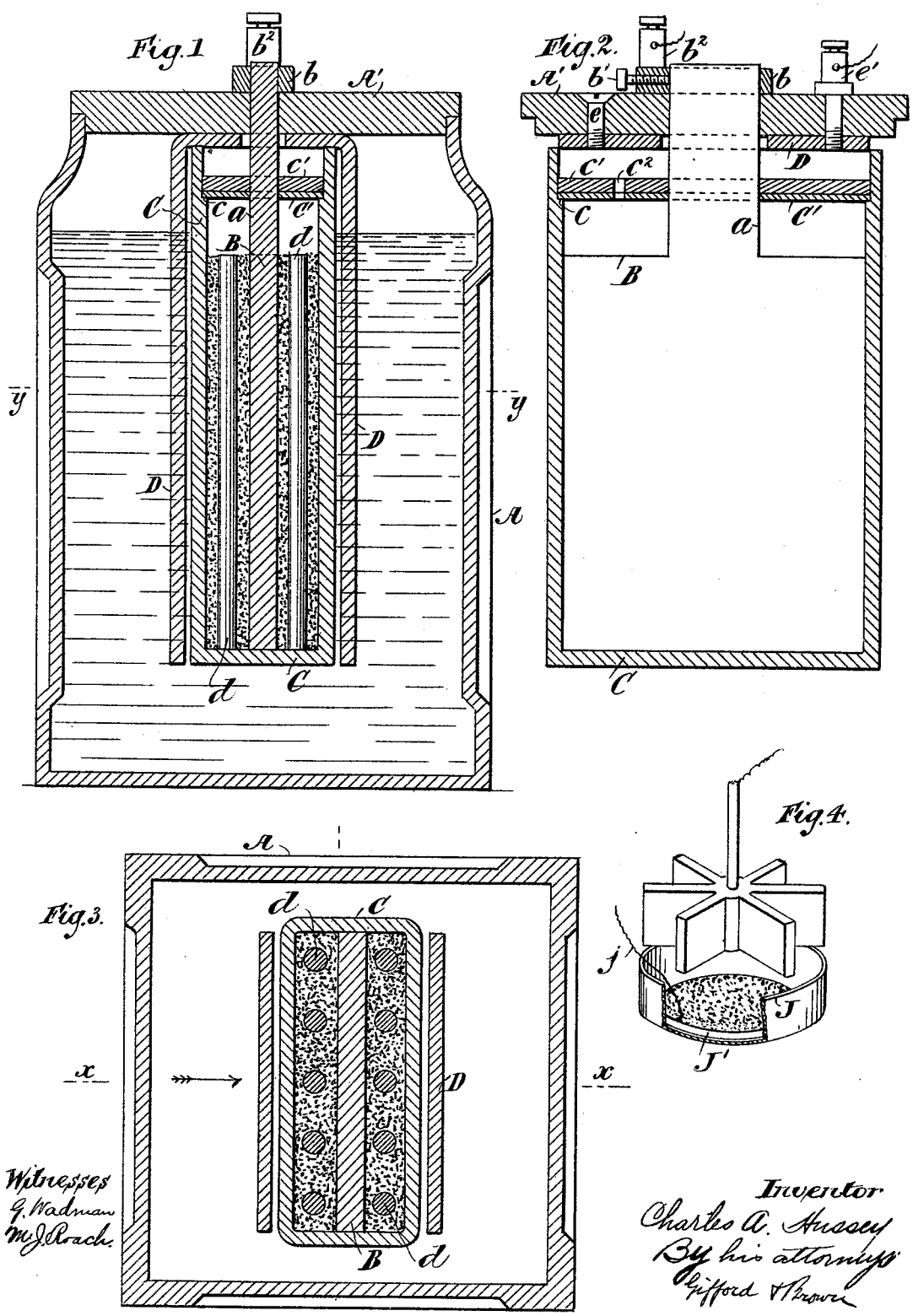

CHARLES A. HUSSEY, OF NEW YORK, N. Y.

ELECTRIC BATTERY.

SPECIFICATION forming part of Letters Patent No. 414,220, dated November 5, 1889.

Application filed January 27, 1888. Serial No. 262,096. (No model.)

*To all whom it may concern:*

Be it known that I, CHARLES A. HUSSEY, of New York, in the county and State of New York, have invented a certain new and useful Improvement in Electric Batteries, of which the following is a specification.

I will describe an electric battery embodying my improvement in detail, and then point out the novel features in claims.

In the accompanying drawings, Figure 1 is a vertical section of a battery embodying my improvement, the section being taken on the plane of the line $x\ x$, Fig. 3. Fig. 2 is a side view, partly in section, of portions of the battery removed from the cell and looking in the direction of the arrow, Fig. 3. Fig. 3 is a horizontal section taken on the plane of the line $y\ y$, Fig. 1. Fig. 4 is a view of certain parts of modified form.

Similar letters of reference designate corresponding parts in all the figures.

Referring first to the example of my improvement shown in Figs. 1, 2, and 3, A designates the cell of the battery. It may be made of glass or other desired material. As shown, it is rectangular in shape. The cell is provided with a cover $A'$, which may be of the same material as the cell.

B designates a carbon, shown as in the form of a plate. This plate is provided in this example of my improvement with a shank $a$, which shank extends through a suitable aperture in the cover $A'$, and is secured above such cover in a metal clamping-piece $b$ by a screw $b'$. By this means the carbon is supported. Upon the metal clamping-piece $b$ is a binding-post $b^2$. The carbon extends into a porous cup C. The latter is shown of rectangular shape and narrower than it is long. It is advantageous to have the carbon extend to the bottom of the porous cup, and I have so illustrated it; but it need not necessarily do so. The porous cup is in this example of my improvement supported upon the carbon. I effect this support in the following manner: $C'$ designates a piece of material, preferably pasteboard, of a shape corresponding to the shape of the interior of the porous cup, and provided with an aperture, through which the shank $a$ of the carbon extends. I have shown the porous cup as shouldered upon its inner surface, as at $c$, near its upper end. Upon this shoulder the pasteboard $C'$ may rest when in position. Upon this pasteboard I pour melted wax or other sealing compound of any suitable kind. I have lettered the wax $c'$. When the wax hardens, it firmly adheres to the shank of the carbon and the sides of the porous cup, thus supporting the latter. The wax forms a seal for the upper end of the porous cup. I have shown an opening $c^2$ in the wax and pasteboard, through which liquid may be poured into the porous cup when necessary, and allows the escape of gases which may be generated in the porous cup. The object of the pasteboard is to support the wax until it hardens. Preferably the wax will be at a distance above the main or body portion of the carbon.

Within the porous cup I place bichloride of mercury. Preferably I fill the cup with the bichloride of mercury up to a level with the top of the main or body portion of the carbon. There will thus be spaces between the wax $c'$ and the bichloride of mercury upon each side of the carbon.

I have found it advantageous in this battery to use absorbent material in combination with the bichloride of mercury for the purpose of assisting in permeating the mass of the latter with moisture. In the example of my improvement shown in Figs. 1, 2, and 3 such absorbent material comprises elongated pieces $d$, extending vertically through the mass at short distances apart. Such absorbent material may consist of rolls or pieces of paper, wicking, or any suitable material, and such material may obviously be arranged in other ways than as shown. When liquid is poured into the porous cup upon the top of the bichloride of mercury, it will be conveyed downwardly through the absorbent material, and thus be caused to quickly permeate the mass.

D designates the zinc. As shown, it is in the form of an inverted U. It is secured to the cover $A'$, and its two legs extend downwardly at the sides of the porous cup. It is shown as secured to the cover by a screw $e$ and binding-screw $e'$.

Any suitable exciting-fluid may be used in the cell—as, for instance, a solution of chloride of sodium and sulphate of zinc, or either of these separately. I prefer that the level of the exciting-fluid should be at about or but little above the top of the main or body portion of the carbon.

In the example of my improvement illustrated in Fig. 4 the porous cup is omitted. I show a star-shaped zinc arranged in close proximity to a cup J, in which latter may be placed an element of the battery—as, for instance, mercury or any suitable amalgam of mercury J'. Even carbon may be used. Upon the mercury or other element J' is placed the bichloride of mercury. A conducting-wire $j$ leads from the mercury or other element J' to a suitable binding-post. (Not shown.)

It will be observed that in both examples of my improvement shown the bichloride of mercury is in electrical contact with an element of the battery. The function of the bichloride of mercury is to operate as an oxidizing agent. In the examples of my improvement shown the bichloride of mercury is in contact with the negative element.

Bichloride of mercury operates to substantially prevent polarization in the battery, and by the combined use in the battery of bichloride of mercury and a solution of chloride of sodium and sulphate of zinc, or either the chloride of sodium or sulphate of zinc separately, little or no local action takes place.

What I claim as my invention, and desire to secure by Letters Patent, is—

1. In a battery, the combination, with positive and negative elements, of an exciting-fluid, bichloride of mercury in electrical contact with one of said elements, and an absorbent material arranged in the bichloride of mercury, substantially as specified.

2. In a battery, the combination, with positive and negative elements, of an exciting-fluid, bichloride of mercury in electrical contact with the negative element, and vertically-arranged absorbent material in the bichloride of mercury, substantially as specified.

3. In a battery, the combination, with positive and negative elements, of an exciting-fluid, bichloride of mercury, and an absorbent material in contact with the bichloride of mercury, substantially as specified.

4. In a battery, the combination, with positive and negative elements and an exciting-fluid, of a porous cup into which the negative element extends, bichloride of mercury within the porous cup, and absorbent material in contact with the bichloride of mercury, substantially as specified.

C. A. HUSSEY.

Witnesses:
 JAMES D. GRISWOLD,
 D. H. DRISCOLL.